United States Patent [19]
Klein, II et al.

[11] Patent Number: 5,757,498
[45] Date of Patent: May 26, 1998

[54] OPTICAL SPRAY COATING MONITORING SYSTEM AND METHOD

[76] Inventors: Richard J. Klein, II, 4028 North Ave.; Douglas L. Sevey, 635 Burbank Ave., both of Waterloo, Iowa 50702; Ricky Jay Bauer, 415 Bergstrom Blvd., Cedar Falls, Iowa 50613

[21] Appl. No.: 658,935

[22] Filed: May 30, 1996

[51] Int. Cl.$^6$ .................... G01B 11/14; G01C 3/00
[52] U.S. Cl. .................... 356/375; 356/3.1; 356/381; 239/1; 239/289
[58] Field of Search .................... 356/375, 373, 356/381, 382, 3.1, 3.11, 3.12; 239/1, 71, 289, DIG. 14

[56] References Cited

U.S. PATENT DOCUMENTS

| Re. 34,749 | 10/1994 | Leong et al. | 250/237 |
|---|---|---|---|
| 1,349,336 | 8/1920 | Haddock . | |
| 2,316,751 | 4/1943 | Adler, Jr. | 88/1 |
| 2,376,836 | 5/1945 | Tunnicliffe | 88/1 |
| 3,117,480 | 1/1964 | Peddinghaus | 83/520 |
| 4,427,880 | 1/1984 | Kanade et al. | 250/222.1 |
| 4,836,671 | 6/1989 | Bautista | 351/1 |
| 4,972,798 | 11/1990 | Ando et al. | 118/669 |
| 5,327,218 | 7/1994 | Igaki | 356/356 |
| 5,351,126 | 9/1994 | Takada et al. | 356/381 |
| 5,355,083 | 10/1994 | George et al. | 324/229 |
| 5,369,486 | 11/1994 | Matsumoto et al. | 356/349 |
| 5,564,830 | 10/1996 | Bobel et al. | 356/381 |
| 5,598,972 | 2/1997 | Klein, II et al. | 239/1 |

FOREIGN PATENT DOCUMENTS

| 1783300 | 12/1992 | U.S.S.R. | 356/381 |

OTHER PUBLICATIONS

Laser Displacement Sensors, LB–1000 Series, Keyence Corporation of America, Cat. No. LB3.
Analog Sensor Controller, Model: RV3–55B/RV3–55R, Keyence Corporation of America, Cat. No. RV3, 1992.
Product Guide, Keyence Corporation of America, Cat. No. PG–93.

*Primary Examiner*—Hoa Q. Pham
*Attorney, Agent, or Firm*—Andrus, Sceales, Starke & Sawall

[57] ABSTRACT

An optical spray coating monitoring system uses a laser displacement sensor and a data acquisition system to monitor a spray gun operator's technique, and display information relating to coating conditions and/or technique. The system includes a laser displacement sensor having a sensor head that is removably attached to a hand held spray gun. The laser displacement sensor measures the distance from the spray nozzle to the surface being coated. The laser displacement sensor also preferably measures the angle of orientation of the spray gun with respect to the surface being coated. The sensor head can also include an infrared temperature sensor. Another embodiment of the invention also uses a second laser displacement sensor. The first sensor measures the distance from the spray gun nozzle to the surface being coated before the coating has been applied to the surface and the second sensor measures the distance after the coating has been applied to the surface, thus allowing determination of the thickness of the wet film on the surface being coated. The measured information is transmitted to the data acquisition system. The data acquisition system provides low level calculations, displays raw data or statistical information, and stores data in memory so that the data can be later downloaded to a computer for further analysis at a later time.

18 Claims, 2 Drawing Sheets

OPTICAL SPRAY COATING MONITORING SYSTEM AND METHOD

FIELD OF THE INVENTION

The invention relates to spray coating systems, and in particular to an optical spray coating monitoring system used to monitor coating technique.

BACKGROUND OF THE INVENTION

Spray guns spray paint or other coatings from a nozzle with compressed air. It is desired that the coat on the surface being coated have uniform thickness at a thickness sufficient for complete coverage of the surface.

In order to optimize the quality of the finish of the coated surface, it is important that the nozzle not be placed too close to the surface being coated. Placing the nozzle too close to the surface can cause an uneven wet film build, as well as runs. The quality and uniformity of the coating coverage typically improves as the distance between the spray nozzle and the surface being coated increases.

However, the spray distance between the nozzle and the surface being coated should not be substantially larger than an optimum spray distance. Letting the spray distance be too large can cause overspray, fogging, or otherwise decrease the efficiency of coating transfer onto the surface being coated. Having the nozzle too far from the surface being coated not only increases the number of coats necessary to provide a sufficient wet film build for proper coverage, but also increases the cost of complying with environmental regulations. High levels of overspray and fogging increase the amount of volatile organic compounds that can escape from spray booths, and also increases the amount of hazardous waste that must be disposed of from air filtering systems.

The distance of the spray nozzle from the surface being coated should be optimized to improve transfer efficiency. The optimum distance between the nozzle and the surface being coated can vary, depending on the type of spray system being used (e.g. conventional compressed air system, electrostatic system, etc.), the type of coating being used, and possibly other factors. Several manufacturers and others in the industry have published data on what is believed to be the optimum spray distance for a variety of conditions.

Transfer efficiency depends not only on the distance between the nozzle and the surface being coated, but also depends on the angle of orientation of the spray with respect to the surface being coated. Optimum transfer efficiency is typically achieved when the spray is perpendicular to the surface being coated.

In many cases, it is also important that the temperature of the surface be appropriate to obtain optimum coating conditions, and consequently optimum transfer efficiencies.

It is generally recognized that transfer efficiency should not drop below 50% or 60%, else a significant amount of coating is wasted and the burden of complying with environmental regulations becomes excessive. Likewise, applying an excessively thick film of coating on the surface wastes the coating and increases the cost of complying with environmental regulations even if the coating transfer efficiency is suitable.

It can be difficult for a person using a spray gun to keep the distance between the spray nozzle and the surface being coated at the optimum spray distance and orientation, while at the same time applying the proper thickness of coating to the surface. This is especially difficult for novices, but even experienced operators often fall out of compliance with industry standards.

SUMMARY OF THE INVENTION

The invention uses optical measuring devices in conjunction with electronic memory devices to monitor and display information relating to the efficiency of an operator's coating technique with a spray gun.

In one aspect, the invention measures the distance of the spray nozzle from the surface being coated. In another aspect, the invention measures the angle of orientation of the spray nozzle with respect to the surface being coated. In a third aspect, the invention measures the wet film thickness as the operator is using the spray gun. In yet another aspect, the invention measures the temperature of the surface being coated. The measured information is transmitted from one or more sensors attached to the spray gun, and converted into digital data which can be displayed in real time or stored in electronic memory for later analysis. The displayed or stored data can be raw data from the one or more sensors, or can be statistical information related to the spray operator's technique. The operator can view displayed data when they are coating to determine when they are in compliance with industry standards.

The invention may also be useful as a training or evaluation tool. The information can be analyzed to determine the transfer efficiency, average wet film build, etc. and the amount of time that the operator is in compliance with minimum industry standards. In this manner, the invention can be used continuously or intermittently to monitor an operator's efficiency.

The information can also be used to control operation of the spray gun. For instance, a controller may deactivate the trigger of the spray gun when the operator has been out of compliance for a pre-selected period of time.

The invention can be used with conventional spray coating systems using compressed air, and also other types of systems including those relying on electrostatics. It is preferred that a sensor head for a laser displacement sensor be removably attached to the spray gun. In order to maintain the integrity of optical beams from the laser sensors, the sensor head can be provided with an air curtain blowing in front of sensor windows to shelter the windows from coating mist.

To measure wet film thickness, the invention contemplates the use of two laser displacement sensors that collectively measure the thickness of the coating on the surface being coated. The first laser displacement sensor measures the distance from the nozzle to the surface being coated before the coating has been applied and the second laser displacement sensor measures the distance from the nozzle to the surface being coated after the coating has been applied. The difference between these distances is the thickness of the coating on the surface being coated.

Other features and advantages of the invention should be apparent upon inspecting the drawings, the following description of the drawings and the claims.

DETAILED DESCRIPTION OF THE DRAWINGS

Figure 1:
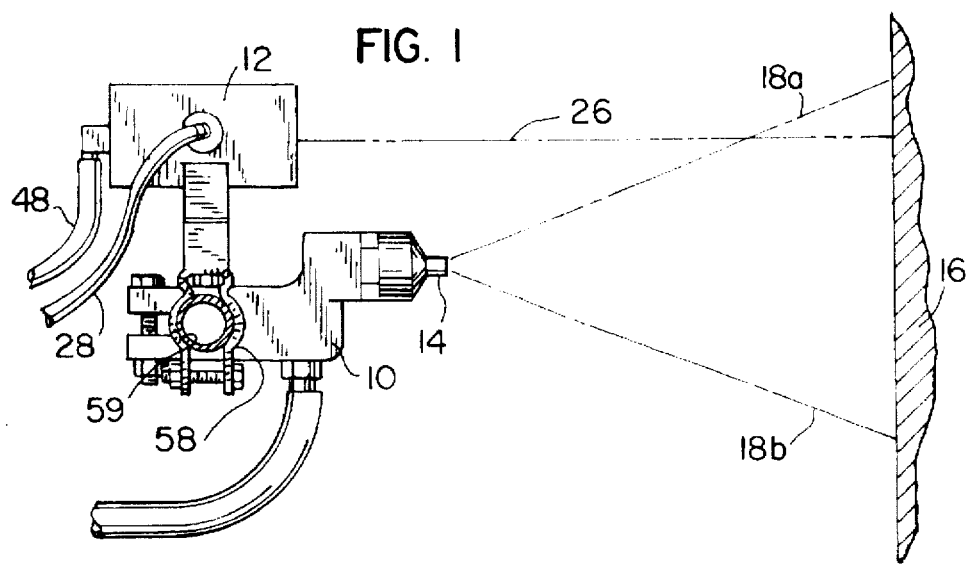
FIG. 1 is a side elevational view of a spray coating system having an optical monitoring system in accordance with a first embodiment of the invention.

FIGS. 1 through 4 illustrate a hand held spray gun 10 having a laser sensor head 12 removably attached to the gun 10 in accordance with a first embodiment of the invention. The gun 10 uses compressed air to spray a coating, such as paint from nozzle 14 onto a surface or object being coated, such as wall surface 16. The spray of the coating from nozzle 14 is illustrated in FIG. 1 by lines 18a and 18b. The sensor head generates an optical beam 26 to measure the distance between the nozzle 14 and the surface 16. The sensor head 12 is mounted to the gun 10 such that the beam 26 propagates in the same forward direction as defined generally by the spray coming from the nozzle 14. The sensor head 12 is attached to the spray gun 10 in a known arrangement so that the distance between the nozzle 14 and the surface 16 can be easily calculated from the output of the optical sensor 12.

Figure 2:
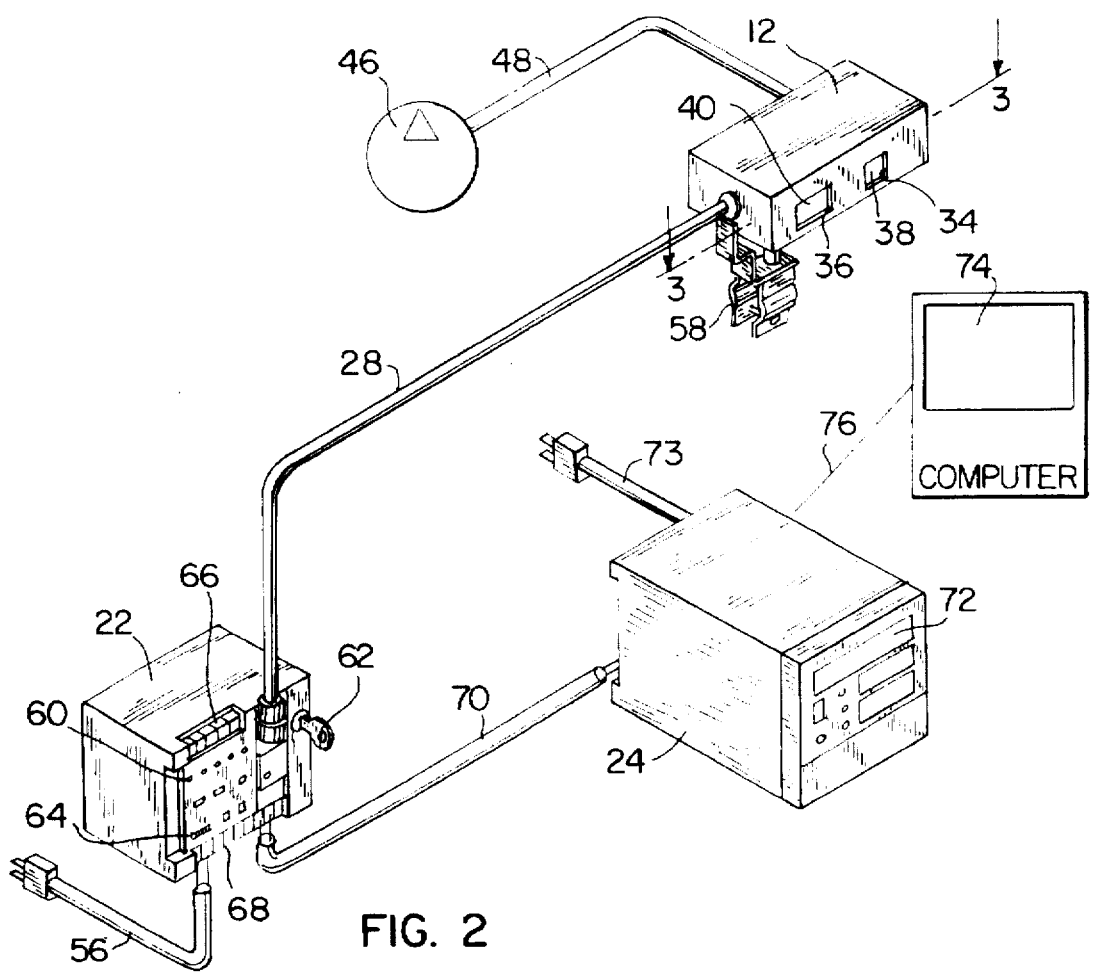
FIG. 2 is a schematic view showing the various components of the optical spray coating monitoring system.

FIG. 2 illustrates the preferred laser displacement sensor 12, 22, and a data acquisition system 24. The laser displacement sensor includes sensor head 12, and a remote controller 22. Controller 22 receives AC power from a conventional outlet through cord 56, and transmits power through cable 28 to the sensor head 12. A suitable laser displacement sensor can be purchased from Keyence Corporation of America, Model No. LB-1000 Series. The sensor head 12 uses the optical beam 26 to measure the distance of the nozzle 14 from the surface 16 being coated, and generates an analog displacement signal in response thereto. The analog displacement signal is transmitted from the sensor head 12 through line 28 to controller 22. In the controller 22, the analog displacement signal can be filtered and amplified. The preferred sensor head 12 is a high resolution-type laser displacement sensor, Keyence Model LB-041. The preferred sensor head preferably uses a visible red semiconductor laser, and has an operating temperature range of 0° to 45° Centigrade. The preferred sensor head 12 has transmitting and receiving windows made of aspherical glass lenses, which are useful to reduce optical aberrations. The preferred laser displacement sensor 12, 22 can detect distances up to about 18 to 20 inches, which is within the preferred range of nozzle to wall distances for most coating applications.

The preferred controller 22 is a Keyence Controller LB-1001. The preferred controller 22 includes indicator lights 60 relating to the operation of the laser sensor head 12, such as whether the laser is on, and whether the surface being coated 16 is within the range of the laser. The controller 22 also includes an ON/OFF key 62, and certain switches 64 to set the sensitivity of the sensor and characteristics of output from the controller 22. In addition, the controller 22 includes an upper input/output terminal strip 66 and a lower input/output terminal strip 68. The controller 22 outputs an analog displacement signal that is transmitted through line 70 to data acquisition system 24.

The preferred data acquisition system 24 is a Keyence Analog Sensor Controller RV3-55B/55R. The data acquisition system 24 has an A/D converter that inputs the analog displacement signal in line 70 from the controller 22 and outputs digital data representative of the displacement signal. The digital data is preferably stored within electronic memory in the data acquisition system 24. The preferred data acquisition system 24 is programmable, and is capable of low level computations. The preferred data acquisition system 24 also has a digital display 72 that can display selected raw data and/or calculated information in real time. The preferred data acquisition system 24 includes a data port such as an RS232 port through which digital data stored in the electronic memory can be downloaded through line 76 onto a computer 74. The data acquisition system 24 receives AC power through cord 73.

The downloaded data can be analyzed using the computer 74 at a later time. For instance, the downloaded data can be analyzed to determine transfer efficiency, or the amount of time that the operator was in compliance with industry standards with respect to transfer efficiency or wet film build, etc. The results of the analysis can be printed or can be displayed on a monitor of the computer 74. In this manner, the technique of one or more operators can be easily evaluated.

Figure 3:
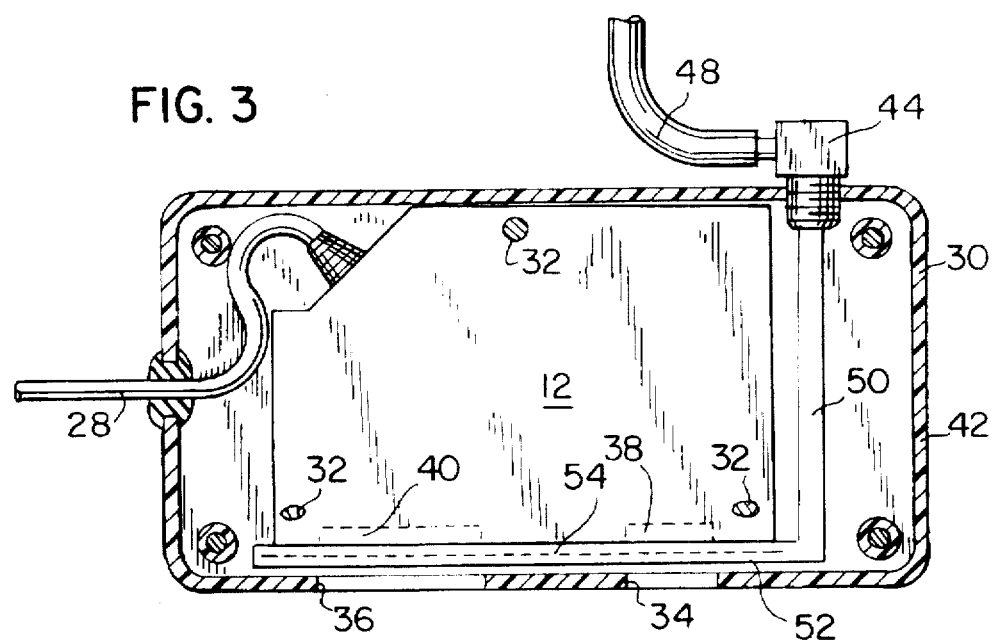
FIG. 3 is a sectional view taken along line 3—3 in FIG. 2 of a sensor head used in accordance with a first embodiment of the invention.

Referring to FIG. 3, the sensor head 12 is preferably mounted within a housing (shown generally by reference arrow 30) using screws 32. The housing 30 preferably defines a rectangular volume and is preferably constructed of two injection molded parts including a main portion 42 and a cover that is attached thereto, preferably with screws. The sensor head housing 30 has a first and second opening 34 and 36 that correspond to windows 38 and 40 on the sensor head 12. The transmitting optical beam passes through window 38, and the detected reflection passes through receiving window 40. The size of the openings 34 and 36 in the housing 30 correspond to the size of the windows 38 and 40 in the sensor head 12.

An air hose fixture 44 is attached to the rear of the housing 30 and provides an opening for compressed air to flow into the housing 30. Compressed air is supplied to the housing 30 from an air source 46 through an air hose 48. Compressed air exits the fixture 44 into a manifold 50 within the housing 30. The manifold 50 has an air curtain tube 52 located within the housing 30 slightly forward of the windows 38 and 40 and extending generally along a longitudinal edge of the windows 38 and 40. The air curtain tube 52 is a small diameter tube having a line of perforations 54 along the length of the tube 52 which are air outlets for discharging a curtain of air in front of the windows 38 and 40. The curtain of air discharging from the tube 52 shelters the windows 38 and 40 from mist to maintain the integrity of the optical beams penetrating through the windows 38 and 40.

Figure 4:
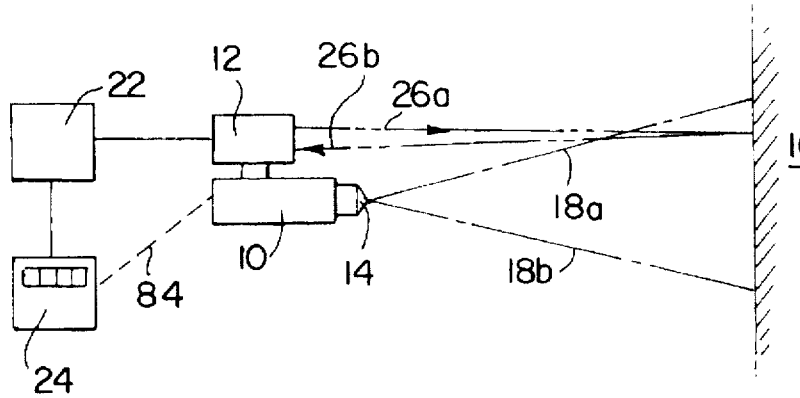
FIG. 4 is a schematic view illustrating the operation of the embodiment of the invention shown in FIG. 1.

Referring to FIG. 4, the sensor head 12 emits a transmitting optical beam 26a that impinges the surface being coated 16, and reflects at least partially to the sensor head 12 as depicted by reference numeral 26b. Based on the optics designated by reference numerals 26a and 26b, the laser displacement sensor 20 measures the distance from a defined location within the sensor head 12 to the surface being coated 16, and generates the displacement signal in response to those measurements. As discussed above, the displacement signal represents the distance of the nozzle to the surface being coated. The displacement signal is typically an analog signal having a 4 to 20 milliamp range, and is transmitted through line 28 to controller 22.

The sensor head 12 includes a bracket 58 that is used to removably attach the sensor head 12 to a boom 59 on the spray gun 10 (see FIG. 1). It is preferred that the sensor head 12 be mounted vertically so that the windows 38 and 40 on the sensor head 12 are aligned vertically.

It is preferred that the sensor head 12 include at least two mirrors and have the capability of measuring an angle of orientation of the sensor head 12 with respect to the surface 16 being coated. As long as the sensor head 12 is mounted so that the transmitting and receiving windows 38 and 40 face a direction parallel to an imaginary line projecting from the nozzle 14 to the center location of the spray pattern on the surface 16, the measured angle of orientation will be indicative of the angle of orientation of the spray gun 10. It is preferred that an orientation signal be generated and transmitted in analog through line 70 to data acquisition system 24 where the information can be converted to digital data and displayed or stored in electronic memory. The direction of the angle of orientation depends on the direction in which the sensor head 12 is mounted to the spray gun 10. If a single sensor head 12 is used to carry out the invention, the sensor head 12 should be mounted vertically because it is more difficult to keep a spray gun 10 from being tilted horizontally than from side-to-side.

The sensor head 12 can also include an infrared temperature sensor to measure the temperature of the surface 16 being coated. The temperature sensor can also transmit an analog signal through line 28 to controller 22, and through line 70 to data acquisition system 24. In this manner, calculations on the data acquisition system 24 relating to optimum transfer efficiency and wet film build under various temperature conditions can be carried out. In addition, the temperature sensor can be used to output an operator-readable temperature indication, so that the operator can know whether the work surface is too hot or cold to coat.

FIG. 4 schematically illustrates the above-described embodiment of the invention using a single sensor head 12 which can measure the distance of the nozzle 14 from the surface 16 being coated, the angle of orientation between the nozzle 14 in the surface 16 being coated, and the temperature of the surface 16 being coated.

Figure 5:
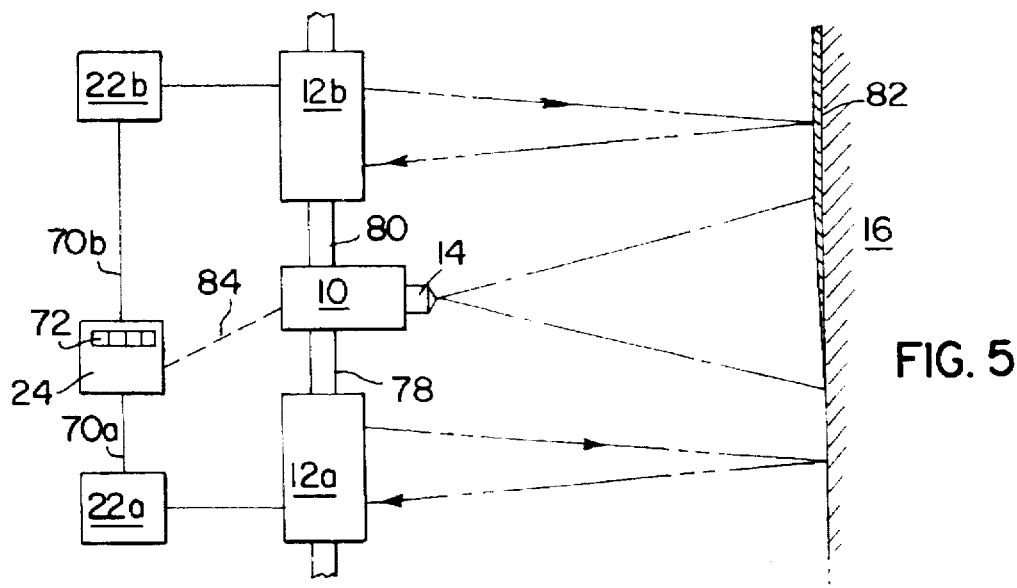
FIG. 5 is a schematic drawing illustrating the operation of a second embodiment of the invention in which optical sensors are used to measure the thickness of the coating on a surface being coated.

FIG. 5 schematically illustrates a second embodiment of the invention having two laser displacement sensors 20, each preferably including a sensor head 12 and a controller 22. This embodiment is especially useful for measuring wet film thickness on the surface 16 as the coating is being applied to the surface 16. The system in FIG. 5 includes a first sensor head 12a attached to a boom 58 extending horizontally from one side of the spray gun 10, and a second sensor head 12b attached to a boom 80 extending from the other side of the spray gun 10. The first laser displacement sensor 12a, 22a measures the distance of the nozzle 14 from the surface being coated 16 before the coating has been applied to the surface. The first laser displacement sensor 12a, 22a outputs a first displacement signal in line 70a to data acquisition system 24. The second laser displacement sensor 12b, 22b measures the distance of the nozzle 14 from the surface being coated after the coating is applied to the surface 16. The controller 22b outputs a second displacement signal in line 70b that is transmitted to the data acquisition system 24. The data acquisition system 24 calculates the difference between the first displacement signal in line 70a and the second displacement signal in line 70b to determine the thickness of the wet film 82 on the surface 16. In this embodiment of the invention, it may be desirable to display the calculated thickness of the wet film 82 on the digital display 72 on the data acquisition system 24. As with the embodiment of the invention shown in FIG. 4, the embodiment shown in FIG. 5 can measure the angle of orientation of the spray gun 10 in relation to the surface being coated 16 if one or both of the sensor heads 12a and/or 12b includes at least two mirrors and the laser displacement sensor 12a, 22a and/or 12b, 22b are capable of measuring an angle of orientation. In FIG. 5, it may be desirable to place one of the sensor heads 12a or 12b in a vertical manner and the other sensor 12a or 12b in a horizontal manner, thereby allowing for two dimensional measurement of the angle of orientation of the spray gun 10 with respect to the surface 16.

The embodiment shown in FIG. 5 can also include a temperature sensor in one of the sensor heads 12a or 12b.

Besides storing raw data and statistical information and displaying selected data, the data acquisition system 24 can be programmed to provide a control signal to alter the operation of the spray gun 10 and/or deactivate the trigger of the spray gun 10 when the operator has been out of compliance for a pre-selected time period, as depicted by dashed line 84 in FIGS. 4 and 5.

It should be appreciated that modifications may be possible which do not substantially depart from the spirit of the invention, and such modifications should be considered to come within the scope of the following claims.

We claim:

1. A spray coating system comprising:

a hand held spray gun having a nozzle from which a coating is sprayed onto a surface;

a laser displacement sensor that measures the distance of the nozzle from the surface being coated and generates a displacement signal in response thereto, the laser displacement sensor having a sensor head that is attached to the hand held spray gun, and a window through which one or more optical beams pass when the sensor head is in operation;

an air hose for receiving a flow of air from an air source;

an air curtain tube located slightly forward of the window and extending generally along an edge of the window, the tube receiving air from the air hose and having one or more air outlets along the length of the tube through which a curtain of air is discharged to shelter the window from coating mist; and electronic memory that stores data representative of the displacement signal.

2. A spray coating system comprising:

a hand held spray gun having a nozzle from which a coating is sprayed onto a surface;

a laser displacement sensor that measures the distance of the nozzle from the surface, being coated and generates a displacement signal in response thereto, the laser displacement sensor also measuring an angle of orientation between an imaginary line projecting from the nozzle to the center of the spray pattern on the surface being coated and generating an orientation signal in response thereto, the laser displacement signal having a sensor head that is attached to the hand held spray gun; and a data acquisition system that inputs the displacement signal and the orientation signal;

wherein the data acquisition system generates a spray gun deactivation signal to indicate when the spray gun has been operated out of compliance with industry standards for a pre-selected period of time, and wherein the spray gun deactivation signal is transmitted to the spray gun.

3. A spray coating system comprising:

a hand held spray gun having a nozzle from which a coating is sprayed onto a surface;

a laser displacement sensor that measures the distance of the nozzle from the surface being coated and generates a displacement signal in response thereto, the laser displacement sensor having a sensor head that is attached to the hand held spray gun; and electronic memory that stores data representative of the displacement signal;

wherein the laser displacement sensor measures an angle of orientation between an imaginary line projecting from the nozzle to the center location of the spray pattern on the surface being coated and generates an orientation signal in response thereto; and wherein the electronic memory also stores data representative of the orientation of the system.

4. A spray coating system as recited in claim 3 wherein the laser displacement sensor generates an analog displacement signal and an analog orientation signal, and the system further comprises a data acquisition system that inputs the analog displacement signal and the analog orientation signal and generates digital data representative of the displacement signal and digital data representative of the orientation signal, and both the digital data representative of the displacement signal and the digital data representative of the orientation signal are stored in the electronic memory.

5. A spray coating system as recited in claim 4 wherein the data acquisition system further has means for displaying the digital data in real time.

6. A spray coating system as recited in claim 4 wherein the system further comprises a laser temperature sensor that measures the temperature of the surface being coated.

7. A spray coating system as recited in claim 3 wherein the sensor head includes one or more windows through which optical beams pass when the sensor is in operation, and the system further comprises:

an air hose for receiving a flow of air from an air source; and an air curtain tube located slightly forward of the one or more windows and extending generally along an edge of each of the windows, the tube receiving air from the air hose and having one or more air outlets along the length of the tube through which a curtain of air is discharged to shelter the one or more windows from coating mist.

8. A spray coating system as recited in claim 3 wherein the sensor head is removable from the hand held spray gun.

9. A spray coating system comprising:

a hand held spray gun having a nozzle from which a coating is sprayed onto a surface;

a first laser displacement sensor that measures the distance of the nozzle from the coated surface before the coating has been applied to the surface and generates a first displacement signal in response thereto, the first laser displacement sensor having a sensor head that is attached to the hand held spray gun;

a second laser displacement sensor that measures the distance of the nozzle from the surface being coated after the coating is applied to the surface and generates a second displacement signal in response thereto, the second laser displacement sensor having a sensor head that is attached to the hand held spray gun;

electronic memory;

wherein the sensor head for the first laser displacement sensor or the second laser displacement sensor includes at least two mirrors and the laser displacement sensor with two mirrors measures an angle of orientation between an imaginary line projecting from the nozzle to the center location of the spray pattern on the surface being coated and generates an orientation signal in response thereto: and wherein the electronic memory stores data representative of the orientation signal and data representative of the first and second displacement signals.

10. A spray coating system as recited in claim 9 wherein the sensor heads for both the first and second laser displacement sensors are removably attached to the hand held spray gun.

11. A spray coating system as recited in claim 9 wherein the first and second displacement signals are analog signals and the system further comprises a data acquisition system having an A/D converter that inputs the analog signals and outputs digital data representative of the first and second displacement signals.

12. A spray coating system as recited in claim 9 wherein the first and second displacement signals are analog signals and the system further comprises a data acquisition system having an A/D converter that inputs the analog signals and outputs digital data representative of the difference between the first and second displacement signals.

13. A spray coating system as recited in claim 12 wherein the data acquisition system further has means for displaying the digital data in real time.

14. A spray coating system as recited in claim 9 wherein the system further comprises a laser temperature sensor that measures the temperature of the surface being coated.

15. A spray coating system as recited in claim 9 wherein the sensor head for both the first and second laser displacement sensors have a window through which optical beams pass, and the system further comprises:

an air hose for receiving a flow of air from an air source; and an air curtain tube located slightly forward of each window and extending generally along an edge of the window, each tube receiving air from the air hose and having one or more air outlets along the length of the tube through which a curtain of air is discharged to shelter corresponding window from coating mist.

16. A spray coating system as recited in claim 9 wherein the data acquisition system generates a spray gun deactivation signal to indicate when the spray gun has been operated out of compliance with industry standards for a pre-selected period of time, and the spray gun deactivation signal is transmitted to the spray gun.

17. A spray coating system comprising:

a hand held spray gun having a nozzle from which a coating is sprayed onto a surface;

a laser displacement sensor that measures the distance of the nozzle form the surface being coated and generates a displacement signal in response thereto, the laser displacement sensor having a sensor head that is attached to the hand held spray gun, the laser displacement sensor also measuring an angle of orientation between an imaginary line projecting from the nozzle to the center of the spray pattern on the surface being coated and generating an orientation signal in response thereto; and display means for displaying information that depends on the displacement signal.

18. A spray coating system comprising:

a hand held spray gun having a nozzle from which a coating is sprayed onto a surface;

a first laser displacement sensor that measures the distance of the nozzle from the coated surface before the coating has been applied to the surface and generates a first displacement signal in response thereto, the first laser displacement sensor having a sensor head that is attached to the hand held spray gun;

a second laser displacement sensor that measures the distance of the nozzle from the surface being coated after the coating is applied to the surface and generates a second displacement signal in a response thereto, the second laser displacement sensor having a sensor head that is attached to the hand held spray gun; and display means for displaying information that depends on both the first and second displacement signal;

wherein the sensor head for the first laser displacement sensor measures an angle of orientation between an imaginary line projecting from the nozzle to the center location of the spray pattern on the surface being coated and generates an orientation signal in response thereto.

* * * * *

UNITED STATES PATENT AND TRADEMARK OFFICE
CERTIFICATE OF CORRECTION

PATENT NO. : 5,757,498
DATED : May 26, 1998
INVENTOR(S) : RICHARD J. KLEIN, II ET AL

It is certified that error appears in the above-indentified patent and that said Letters Patent is hereby corrected as shown below:

In The Claims

Claim 2, column 6, line 18, after "surface" delete ","; Claim 17, column 8, line 26, delete "form" and substitute therefor -- from --.

Signed and Sealed this

Eighteenth Day of May, 1999

Attest:

Q. TODD DICKINSON

Attesting Officer          Acting Commissioner of Patents and Trademarks